United States Patent
Weiss et al.

(10) Patent No.: US 7,156,575 B2
(45) Date of Patent: Jan. 2, 2007

(54) SHAFT-HUB CONNECTION

(75) Inventors: Rudolf Weiss, Vreden (DE); Patrice Millet, Vreden (DE); Rudolf Scheithauer, Vreden (DE)

(73) Assignee: Atec-Weiss GmbH & Co. KG, Vreden (DE)

( * ) Notice: Subject to any disclaimer, the term of this patent is extended or adjusted under 35 U.S.C. 154(b) by 0 days.

(21) Appl. No.: 10/617,119

(22) Filed: Jul. 10, 2003

(65) Prior Publication Data

US 2004/0105717 A1    Jun. 3, 2004

(30) Foreign Application Priority Data

Jul. 12, 2002    (DE)    .................. 102 31 840

(51) Int. Cl.
  *F16D 1/06* (2006.01)
  *F16D 7/02* (2006.01)
(52) U.S. Cl. .................. 403/1; 403/335; 403/337; 403/365; 403/369; 403/374.3; 192/56.1
(58) Field of Classification Search .............. 403/1, 403/335, 336, 337, 365, 369, 371, 374.3; 464/30, 42; 192/56.1, 55.1
See application file for complete search history.

(56) References Cited

U.S. PATENT DOCUMENTS

| | | | | |
|---|---|---|---|---|
| 3,751,941 A | | 8/1973 | Stiff | |
| 3,849,015 A | * | 11/1974 | Peter et al. | .................. 403/370 |
| 4,268,185 A | * | 5/1981 | Mullenberg | .................. 403/370 |
| 4,944,379 A | * | 7/1990 | Haaser | |
| 5,328,009 A | * | 7/1994 | Whitehurst et al. | |
| 5,599,129 A | * | 2/1997 | Clifton et al. | .................. 403/2 |
| 5,970,932 A | * | 10/1999 | Richardson et al. | ..... 123/90.36 |
| 2002/0160888 A1 | * | 10/2002 | Chen et al. | |

FOREIGN PATENT DOCUMENTS

| | | |
|---|---|---|
| DE | 916 370 C | 8/1954 |
| DE | 2 031 142 B2 | 12/1971 |
| DE | 77 36 362 U | 3/1978 |
| DE | 41 18 941 C2 | 12/1992 |

* cited by examiner

*Primary Examiner*—Daniel P. Stodola
*Assistant Examiner*—Victor MacArthur
(74) *Attorney, Agent, or Firm*—Collard & Roe, P.C.

(57) ABSTRACT

The present invention relates to a shaft-hub connection having an attachment flange and a clamping element, particularly a clamping ring, attachable thereto, by means of which the shaft end assigned to the attachment flange may be friction-locked to the attachment flange, with an interposed bushing which receives a slip torque. The present invention is based on the object of refining a device of the type initially cited in such a way that the lifetime of the attached components in the drivetrain is increased. This object is achieved according to the present invention in that the bushing is designed in multiple parts in the axial direction.

14 Claims, 2 Drawing Sheets

SHAFT-HUB CONNECTION

BACKGROUND OF THE INVENTION

1. Field of the Invention

The present invention relates to a shaft-hub connection having an attachment flange and a clamping element, particularly a clamping ring, attachable thereto, by means of which the shaft end assigned to the attachment flange may be friction-locked to the attachment flange with a bushing, which takes up a slipping moment, interposed between them.

2. Description of the Related Art

Such a shaft-hub connection known from the related art is used as an overload protector for briefly occurring, particularly high-frequency torque impulses. In this way, the connected machines are protected from the overload damage caused by the torque impulses. This is brought about in that the bushing positioned between the clamping element and the shaft end may absorb a slipping moment which causes the bushing, which is particularly implemented as a bronze bushing, to be able to slip in the attachment flange, the shaft and the hub element assigned thereto remaining untouched by this slipping process.

In the event of slipping through following the occurrence of a short-circuit torque, abrasion typically occurs on one of the sliding surfaces of the bushing, which is coated with a suitable sliding film both on its inner sliding surface and on its outer sliding surface for this purpose. A disadvantageous effect of this solution is, however, that the arrangement has only a low lifetime in the event of frequently occurring short-circuit torques, because then all sliding surfaces have been "scuffed".

SUMMARY OF THE INVENTION

The present invention is based on the object, starting from this related art, of refining a device of the type initially cited in such a way that the lifetime of the shaft-hub connection is increased.

This object is achieved according to the present invention in that in a shaft-hub connection according to the preamble, the bushing is designed in multiple parts in the axial direction.

The solution of the object according to the present invention is distinguished in that now, due to the bushing divided multiple times in the axial direction, multiple rings, each having separate inner and outer sliding surfaces, have been made, which permit a corresponding number of "scuffing procedures" in the sliding surfaces.

Further preferred embodiments arise from the subclaims.

BRIEF DESCRIPTION OF THE DRAWINGS

The present invention is described in greater detail in the following on the basis of a drawing which shows an exemplary embodiment.

DESCRIPTION OF THE PREFERRED EMBODIMENTS

Figure 1:
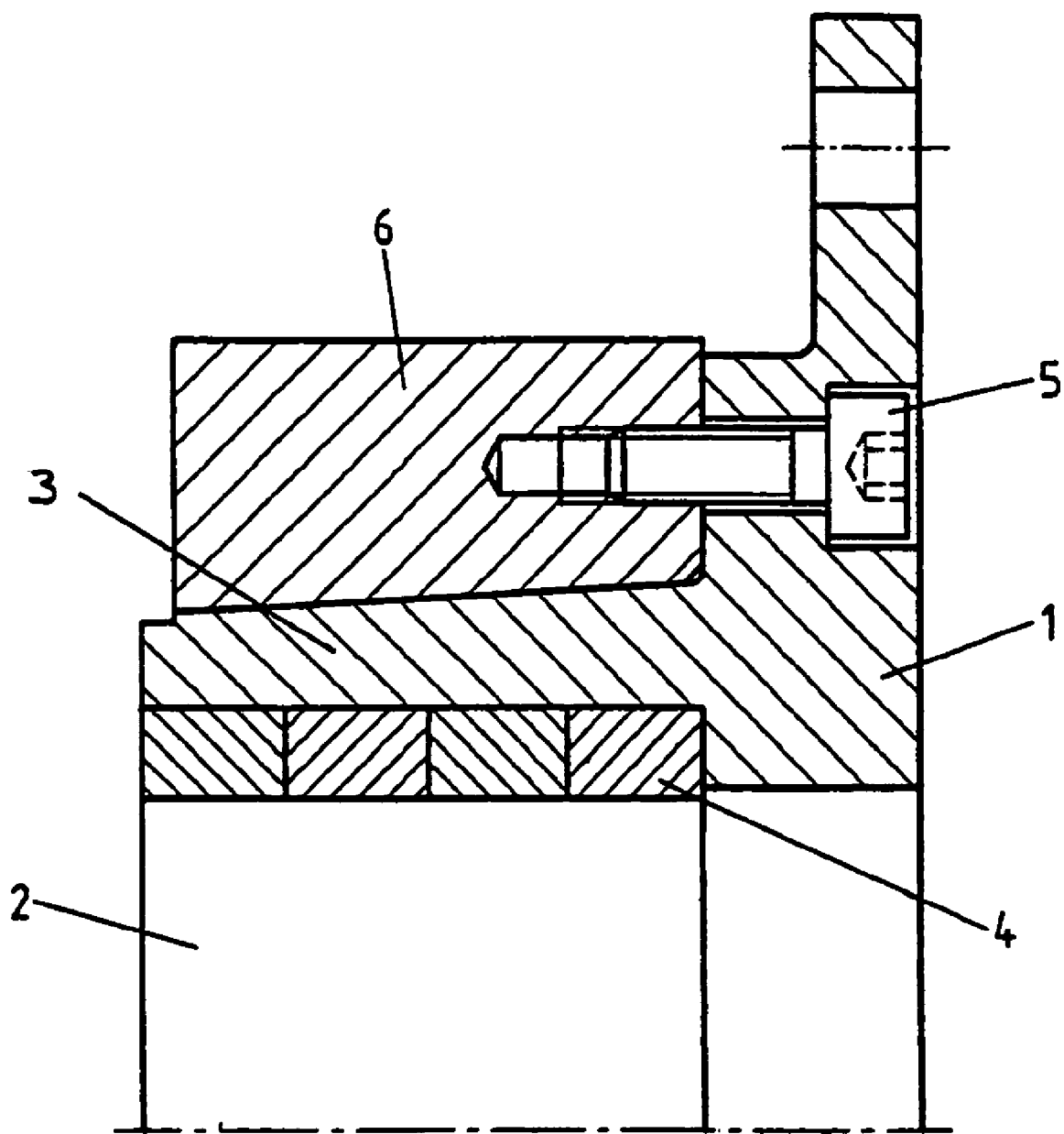
FIG. 1 shows a first exemplary embodiment of a shaft-hub connection according to the present invention in a side view.

According to the first exemplary embodiment shown in FIG. 1, the shaft-hub connection comprises an attachment flange 1. Only a section of the attachment flange 1 is shown, which a shaft end 2 runs into.

The attachment flange 1 is implemented in the form of a hub element, a part of the hub element extending out over the shaft end 2. A clamping ring 6, which is used as a clamping element, is attached to the attachment element 1 via attachment means implemented as clamping screws 5. Through the wedge-shaped implementation of the hub element on its outer surface facing the clamping ring 6, a frictional connection of the clamping ring 6 against the hub element is achieved when the clamping screws 5 are tightened. For this purpose, the surface of the hub element is greased in its conical region.

A bushing, implemented from bronze, which is formed by multiple annular bushing elements, four in the exemplary embodiment shown in FIG. 1, is positioned between the clamping ring 6 and the shaft end 2. The bushing elements are each coated on their inner sliding surfaces, assigned to the shaft end 2, and their outer sliding surfaces, assigned to the inside of the hub element of the attachment flange 1. If a short-circuit torque arises due to overload, the shaft 2 may slip through between the bushing 4 and the hub, which is under a clamping effect, using the bushing elements 4. In this way, „scuffing" of the hub on the shaft is avoided. The level of the slipping moment (slip torque) which is to be taken by the bushing in case of overload may be preset in this case. The precision of the presetting is approximately 10%. In this case, the dispersion of the slip torque is a function of the actual tolerance of the shaft 2. Through the divided construction of the bushing 4 in the form of multiple axially neighboring rings, the bushing itself may absorb the required slip torque even if one or more sliding surfaces of the rings have already been damaged as a consequence of previously occurring overload and "scuffing" of the sliding surfaces caused thereby.

Figure 2:
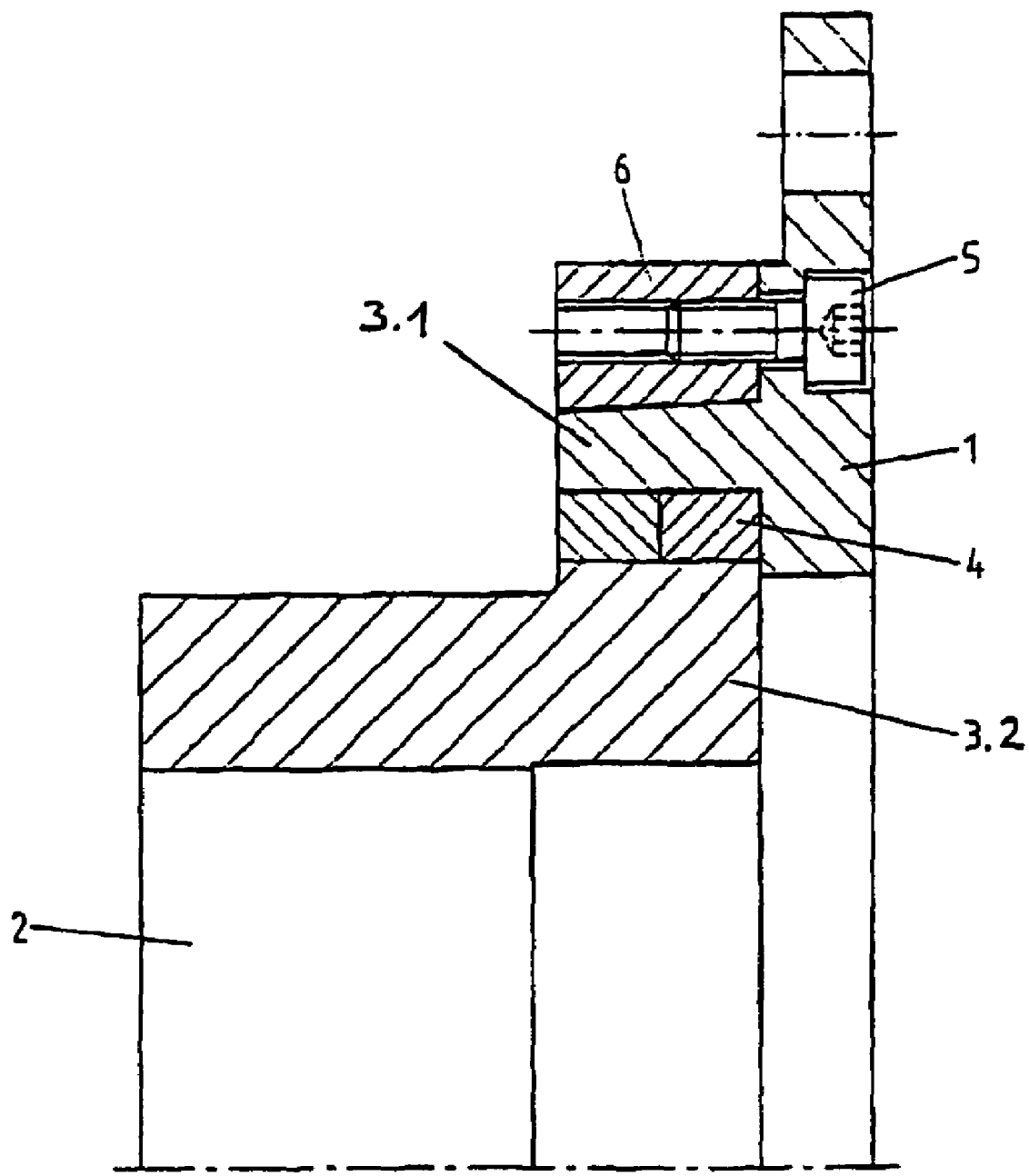
FIG. 2 shows a second exemplary embodiment of a shaft-hub connection according to the present invention, also in a side view.

The second exemplary embodiment of the present invention shown in FIG. 2 differs from the first exemplary embodiment shown in FIG. 1 in the design of the hub and sleeve, respectively, in connection with the attachment element 1. In this case, the hub-sleeve element is implemented in multiple parts, a first hub part 3.1 being implemented in one piece with the attachment flange 1 and extending over the length of the bushing 4. The other part of the hub is implemented as a sleeve-shaped hub core 3.2 and assigned to the shaft end 2. In this exemplary embodiment, the bushing 4 works together directly with the hub core 3.2, the bushing 4 only being divided one time in this exemplary embodiment due to its lower length and therefore including two rings. In this embodiment as well, the bronze bushing 4 receives a slip torque if a short-circuit torque occurs, shaft 2 and hub core 3.2 remaining untouched by this slip torque and stress of only the outer or inner sliding surfaces of one of the rings of the bushing 4 occurring. Apart from the mode of operation, which is otherwise identical to the exemplary embodiment shown in FIG. 1, the solution of the object shown in FIG. 2 is distinguished in that the precision of the slip torque may be increased to ±5%, independently of the actual shaft tolerance in this case.

The invention claimed is:

1. A shaft-hub connection comprising:
   an attachment flange (1) having a hub-sleeve element that is homogenous therewith, the hub-sleeve element having a radially outermost surface that is conical;
   a clamping element (6) threadably receiving a bolt for drawing said clamping element towards said attachment flange, said clamping element having a conical radially innermost surface in wedging contact with said conical surface of said hub-sleeve element, said wedging contact causing a shaft end assigned to said attachment flange to be connected by frictional connection to said attachment flange; and a bushing (4) positioned between said hub-sleeve element and said shaft end to take up a slip torque, said bushing designed in multiple separable parts in its axial direction, wherein said hub-sleeve element is under a clamping effect of said clamping element (6), and wherein the level of the slip torque which is to be taken by said bushing (4) can be preset.

2. The shaft-hub connection according to claim 1, wherein said clamping element is a clamping ring (6).

3. The shaft-hub connection according to claim 1, wherein said bushing (4) is a bronze bushing.

4. The shaft-hub connection according to claim 1, wherein said bushing (4) is provided with a sliding film on its inner and the outer sliding surfaces.

5. The shaft-hub connection according to claim 1, wherein said hub-sleeve element is implemented in one piece with said attachment flange (1) and extends essentially over the length of said bushing (4).

6. The shaft-hub connection according to claim 1, wherein said clamping element is a clamping ring.

7. The shaft-hub connection according to claim 1, wherein said bushing is a bronze bushing.

8. The shaft-hub connection according to claim 1, wherein said bushing is provided with a sliding film on its inner and the outer sliding surfaces.

9. The shaft-hub connection according to claim 1, wherein said hub-sleeve element extends over the length of said bushing.

10. A shaft-hub connection comprising:

an attachment flange (1);

a clamping element (6) which is attachable to said attachment flange and by means of which a shaft end (2) defining an axial direction assigned to said attachment flange is connectable by frictional connection to said attachment flange;

a hub-sleeve element which is implemented in multiple parts, with a first part (3.1) having a conical outer surface region and being implemented in one piece with said attachment flange (1) and another part (3.2) being assigned as a sleeve-shaped hub core to said shaft end (2); and at least two bushings (4) positioned radially between said first part (3.1) of the hub-sleeve element and said another part (3.2) of the hub-sleeve element to take up a slip torque and the bushings contacting one another in the axial direction;

wherein said first part (3.1) of the hub-sleeve element extends over the length of said at least two bushings (4), in contact therewith;

wherein said hub-sleeve element is under a clamping effect of said clamping element; and wherein the level of the slip torque which is to be taken by said bushings can be preset by adjusting a bolt (5) which connects the attachment flange (1) with the clamping element (6).

11. The shaft-hub connection according to claim 10, wherein said clamping element is a clamping ring (6).

12. The shaft-hub connection according to claim 10, wherein said bushings (4) are bronze bushings.

13. The shaft-hub connection according to claim 10, wherein each of said bushings (4) is provided with a sliding film on its inner and outer sliding surfaces.

14. A shaft-hub connection comprising:

an attachment flange having a hub-sleeve element that is implemented in one piece therewith, the hub-sleeve element having a radially outermost surface that is conical;

a clamping element threadably receiving a bolt for drawing said clamping element towards said attachment flange, said clamping element having a conical radially innermost surface in wedging contact with said conical surface of said hub-sleeve element, said wedging contact causing a shaft end assigned to said attachment flange to be connected by frictional connection to said attachment flange; and a bushing positioned between said hub-sleeve element and said shaft end to take up a slip torque, said bushing designed in multiple separable parts in its axial direction, wherein said hub-sleeve element is under a clamping effect of said clamping element, and wherein the level of the slip torque which is to be taken by said bushing can be preset.

* * * * *